No. 618,200. Patented Jan. 24, 1899.
S. L. DENNEY.
DIVIDED CAR AXLE.
(Application filed Feb. 26, 1898.)
(No Model.)

WITNESSES: INVENTOR:
Samuel L. Denney

United States Patent Office.

SAMUEL L. DENNEY, OF ATLANTIC CITY, NEW JERSEY.

DIVIDED CAR-AXLE.

SPECIFICATION forming part of Letters Patent No. 618,200, dated January 24, 1899.

Application filed February 26, 1898. Serial No. 671,721. (No model.)

*To all whom it may concern:*

Be it known that I, SAMUEL L. DENNEY, a citizen of the United States of America, residing in Atlantic City, in the county of Atlantic, in the State of New Jersey, have invented certain new and useful Improvements in Divided Car-Axles, of which the following is a specification.

My invention relates to improvements in car-axles, and is of that class or design known as compound or divided axles, which are designed to allow the oppositely-positioned wheels on the axle to automatically accommodate themselves to the varying curvatures of the track during the progress of the wheels around curves.

The present invention is intended to improve and simplify the construction and arrangement of the parts as shown and described in my former Letters Patent, Nos. 366,307 and 551,746, wherein the two parts of my divided axle are constructed with oppositely-arranged and abutting frustums of cones held by coupling-sleeves of particular construction to permit the required and desirable independent rotation of the respective parts of the axle and the wheels secured thereon. These earlier constructions served the purpose intended and operated with reasonable certainty and effectiveness; but by the present invention I am enabled to dispense with the conical enlargement on one of the sections or parts of the axle and the tapered sleeve fitted thereon and by a more simple and effective coupling arrangement to greatly reduce the cost of manufacture without sacrificing in the least the completeness and durability of the operation.

I have fully and clearly illustrated my invention in the accompanying drawings, wherein—

Figure 1:
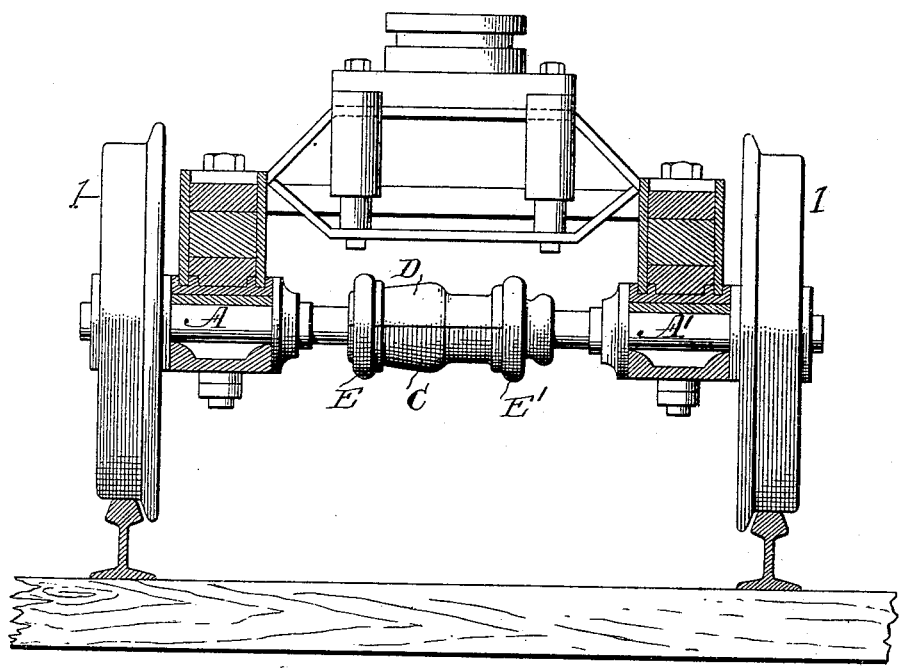
Figure 2:
Figures 3, 5:
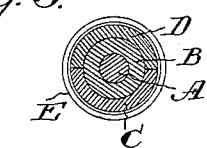
Figures 4, 6:
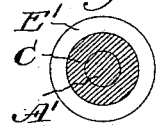

Figure 1 is a front view of a pair of wheels fitted to a compound axle embodying my present invention and having a new and improved coupling-sleeve mounted thereon. Fig. 2 is a central vertical longitudinal section through the coupled parts of the axle. Fig. 3 is a sectional view through portion D of the coupling-sleeve; Fig. 4, a side view of the coupling with the section D removed. Figs. 5 and 6 are transverse sections on lines $x\ x$ and $y\ y$ of Fig. 2.

Fig. 1 designates car-wheels secured in the well-known way on the respective portions of the divided axle A A', substantially as shown in the drawings. The parts $d\ d$, Fig. 4, of the axle are formed a true cylinder, the inner ends terminating near the middle of the coupling-sleeve D, as shown in the drawings. The peculiar form of the enlarged portion of the axle at B and the corresponding form of the interior of the coupling-sleeve D are such that they cannot be fitted to each other with the degree of accuracy required by the ordinary methods of turning and boring. Therefore to secure the double purpose—that of accurate fitting in the parts and a hard wearing-surface in the same—I have so designed the parts that they can be conveniently and most economically produced by casting in the following manner: That part of the axle A to receive the enlargement B is reduced in its diameter at $a$, the object of which is to give the enlargement a greater thickness of metal than otherwise would exist at that point, and also to form a shoulder, so that in no emergency or in the event of the enlarged portion being broken could the axle be drawn out of the coupling or a change in the gage of the wheels be effected. The section is then placed in a suitable mold, and the enlargement is cast directly and most securely on the axle and is made of metal of a strong and hard texture that will possess the most durable wearing qualities.

The straight extension of the axle from the base of the cone B is to add sufficient length to the bearing-surface in coupling sleeve D and the axle A to secure the necessary inflexibility required in the connection of the parts, substantially as shown in the drawings. This part of the axle, including the enlargement B, being turned up to a finish is ready to be placed in a mold formed by a pattern similar to that of the coupling-sleeve D, (shown in Fig. 4,) in which the two sections of axles meet, and in that position the metal is poured into the mold, surrounding, as it does, the end of axle A at C, securely and rigidly connecting the two parts together, while in the remaining length of the coupling the metal rising in a horizontal line only to the center of the axle, which can be readily removed from the coupling-sleeve after the metal has cooled to the degree necessary to effect the chilling of the interior of the coupling-sleeve at $d^4$.

It will be noticed that a portion of the end of axle A' is left exposed for half its of diameter, the object of which is to have the separable portion of the sleeve D, Fig. 3, to overlap the abutting ends of the sections of axles at that point in the coupling-sleeve where any desired strength of metal that may be necessary may be added by enlarging the diameter of that part of the sleeve without interfering in any way with the due proportions of the connecting parts.

The separable part D of the coupling-sleeve is made by the same process by casting in a suitably-arranged mold, the same section of axle being employed to effect the chilling of its interior surface $d^4$. Shoulders $c^4$ and $c$ are formed on the two parts of the coupling-sleeve D D, against which the bands E E' rest when the parts are securely confined upon the axle.

The wearing-surfaces in the enlarged and straight portions of the connection are proportioned in their relation to the wearing of the journals on the axle, which carry the weight of the car, so as to outlast the latter without the necessity of any readjustment or renewal of any part of the connections. The two parts of the coupling-sleeve, after being made in the manner described, are placed on the axle and temporarily secured while being subjected to a slight grinding operation which secures the most perfect fitting of the parts. This being accomplished, the bands E E are shrunken upon the exterior surface of the coupling-sleeve at the points $c$ and $c^4$, which securely confines the coupling-sleeve upon the axle, which has sufficient play within the coupling to admit the independent movement of the wheels while passing over the curves in the track. The bearing-surfaces in the connecting parts are so proportioned in their area and the temper of the metal contained therein as to possess that durability which will make that part of the axle practically indestructible, thereby rendering readjustment or renewing of the parts unnecessary during the life of the axle, while a much less frequent introduction of oil will be required than where the parts are constructed of metal possessing only ordinary commercial qualities, as that used in the manufacture of car-axles.

Heretofore the axles with the enlarged portion have been made by being forged into shape with the straight round portions substantially true and the enlarged portions in rough shape approximating the shape required and then turned down and shaped in the lathe. This method of construction, while tedious and expensive, failed in securing the desired result, which is a hard and durable bearing-surface in the enlarged part of the axle and in the interior of the coupling-sleeve, in which that part of the axle rotates automatically when the curves in the track render the independent movement of the wheels necessary.

By experience I have found that the peculiar form and the superficial area of the bearing-surfaces in the connecting parts to keep them within the proportions desired in the space occupied when employed in the pony-trucks and tenders of locomotive-engines that it requires forms of peculiar shape and degree of temper or hardness to fully and economically meet the requirements, which it is impossible by the ordinary methods employed to successfully produce. I therefore, after repeated experiments, have succeeded by the process described, adopted the method of casting the parts which admits of the employment of such form of construction as will secure the best results—viz., the greatest durability in the parts—which will render unnecessary readjustment or renewal of any of these parts, avoid change of gage between the wheels and track, and render the lubricating of the rotating part of the axle much less frequent than is required where the metals are of their normal texture. As will be readily understood, by the method herein described any desired form of journal in the connection of the two sections of axles which experience may prove to be best adapted to the purpose can be made available in this method of construction and may be adopted in the construction of compound car-axles of this description. I therefore do not confine myself to the exact form here shown, but claim the right to vary the same within the prescribed limits of the patent laws.

Having thus described my invention, what I desire to secure by Letters Patent is—

1. An axle divided near its mid-length comprising the axle-section A, formed with a conical enlargement adjacent to its inner end, a straight bearing-surface at the base of the cone a coupling-sleeve confining the parts securely in line and admitting the rotation of the coned section within the coupling-sleeve as the action of the curves in the track may require the adjustment of the wheels to the radius of the curves to prevent the shearing of the flanges against the outer rail of the track, substantially in the manner shown and described.

2. As an improvement in car-axles, an axle divided near its mid-length formed with a conical enlargement near its inner end, a straight bearing-surface at the base of the cone, a coupling-sleeve constructed with a separable part D and bands E E for confining the parts securely in place—substantially as shown and described.

In testimony whereof I have hereunto affixed my signature in the presence of two witnesses.

SAMUEL L. DENNEY.

Witnesses:
ARTHUR W. KELLY,
HARRY I. RAUP.